United States Patent [19]

Buschhaus et al.

[11] Patent Number: 5,713,425
[45] Date of Patent: Feb. 3, 1998

[54] PARALLEL HYBRID POWERTRAIN FOR AN AUTOMOTIVE VEHICLE

[75] Inventors: Wolfram Buschhaus; Bradford Bates, both of Ann Arbor; Richard C. Belaire, Whitmore Lake; Allan R. Gale, Allen Park, all of Mich.

[73] Assignee: Ford Global Technologies, Inc., Dearborn, Mich.

[21] Appl. No.: 585,608

[22] Filed: Jan. 16, 1996

[51] Int. Cl.⁶ .............................................. B60K 6/04
[52] U.S. Cl. .......................... 180/65.2; 74/661; 180/297; 180/65.7
[58] Field of Search ..................... 180/62, 297, 65.1, 180/65.2, 65.4, 65.6, 65.7; 74/661, 665 R

[56] References Cited

U.S. PATENT DOCUMENTS

| | | | |
|---|---|---|---|
| 3,211,249 | 10/1965 | Papst | 180/65.2 |
| 4,042,056 | 8/1977 | Horwinski | |
| 4,098,144 | 7/1978 | Besel et al. | 180/65.2 X |
| 4,180,138 | 12/1979 | Shea | |
| 4,305,254 | 12/1981 | Kawakatsu et al. | 60/716 |
| 4,407,132 | 10/1983 | Kawakatsu et al. | 60/716 |
| 4,470,476 | 9/1984 | Hunt | 180/65.2 |
| 4,531,605 | 7/1985 | Scholz et al. | 180/65.2 X |
| 4,533,011 | 8/1985 | Heidemeyer et al. | 180/65.2 |
| 5,078,229 | 1/1992 | Kikuchi et al. | 180/297 X |
| 5,249,637 | 10/1993 | Heidl et al. | 180/65.2 |
| 5,327,992 | 7/1994 | Boll | 180/65.2 |
| 5,337,848 | 8/1994 | Bader | 180/65.2 |
| 5,343,970 | 9/1994 | Severinsky | 180/65.2 |
| 5,348,516 | 9/1994 | Shibata | 180/297 X |
| 5,495,906 | 3/1996 | Furutani | 180/65.2 |
| 5,562,566 | 10/1996 | Yang | 180/65.2 X |

Primary Examiner—Brian L. Johnson
Assistant Examiner—Michael Mar
Attorney, Agent, or Firm—Richard D. Dixon; Roger L. May

[57] ABSTRACT

A hybrid powertrain for an automotive vehicle comprising an internal combustion engine and transmission assembly providing a first selectably shiftable geared torque flow path to vehicle traction wheels and an electric motor-generator unit defining a second geared torque flow path that is located between the output of the first geared torque flow path and the traction wheels. Through the deployment of an appropriate control system, including the necessary control algorithms, the electric motor-generator unit can be operated to supply torque to the traction wheels while the torque flow in the first torque flow path is interrupted during the occurrence of a ratio change in the transmission assembly and during disengagement of a clutch. Because of this interactive control of two power sources, the vehicle driveability can be enhanced along with an improvement of the engine exhaust gas emissions. In addition, the electric motor-generator unit in the second torque flow path can be used to launch the vehicle electrically immediately upon request of the operator. This ability of the powertrain permits engine-off operation during vehicle coast-down and standstill periods without any loss of driveability. During electric launch of the vehicle, the interactive control of the two power sources permits the internal combustion engine to be restarted and then gradually take over the propulsion task from the electric motor-generator unit.

5 Claims, 2 Drawing Sheets

PARALLEL HYBRID POWERTRAIN FOR AN AUTOMOTIVE VEHICLE

TECHNICAL FIELD

This invention relates to hybrid vehicles having a main power plant and an auxiliary power plant in the form of an electric motor-generator unit, and parallel torque flow paths between a driven member and the power plants.

BACKGROUND OF THE INVENTION

It is well known in the art to use an electric motor and an internal combustion engine in an automotive vehicle driveline defined as a hybrid drive. In such prior art arrangements, the electric motor usually is connected with the vehicle traction wheels through a geared torque flow path and a first torque interrupting clutch. A torque flow path from the internal combustion engine to the wheels usually is arranged in series with the electric motor using second gearing and a second torque interrupting clutch. The clutches are actuated independently, one with respect to the other. In some instances, the engine may be used with an energy storing flywheel, but it also may be used in conjunction with the electric motor in such a way that the rotating mass of the driveline intermediate the two clutches can be used to store the kinetic energy. In such instances, the rotary elements of the electric motor act as a flywheel.

In other arrangements known in the art, the vehicle may be provided with separate driving axles wherein one axle is driven by the internal combustion engine and a second driven axle of the vehicle is driven by an electric motor. When the engine operates as the primary source of torque, the motor-generator can act as a generator which recharges a battery used to energize the electric motor during the driving mode for the electric motor. This arrangement, as in the case of the present invention, is a parallel hybrid drive, but the two torque flow paths for the engine and the electric motor are separated, one with respect to the other, with the engine driving one driving axle and the electric motor driving the other. Typical examples of hybrid drives of this type may be seen by referring to U.S. Pat. Nos. 4,533,011 and 5,249,637.

Such prior art designs are not capable of improving vehicle driveability. They do not make provision, furthermore, for driveline torque management to improve driveability during shifts when transient torque interruption occurs. This shortcoming of prior art designs with respect to driveability results from their inability to respond quickly to a ratio change command. During the shift time interval, changes in the driveline inertia due to torque fluctuations during acceleration and deceleration of rotary masses directly related to the shift event cannot easily be managed in conventional vehicles. Also, the time that is required for the transmission electro-hydraulic components to respond to a ratio shift command complicates the task of driveline torque management during shift transients.

BRIEF DESCRIPTION OF THE INVENTION

Our invention is a parallel hybrid vehicle driveline that has an internal combustion engine and an electric motor-generator unit that define parallel torque flow paths using common geared elements between a single driving axle and each of the two sources of torque. This will permit engine-off operation during coasting and standstill without any loss of driveability due to the ability of the electric motor-generator unit to provide propulsion torque while the engine is being restarted, thereby making it possible to minimize fuel consumption and to reduce undesirable exhaust emissions of the engine. It also permits a launch of the vehicle electrically using the motor-generator unit while the engine is being restarted. Further, it will enhance the driveability of the automatic transmission used with the internal combustion engine by means of an interactive control of the two power sources.

Our improved hybrid vehicle uses an electric motor-generator unit between the transmission and the wheels, thereby allowing improved operating and calibration freedom for the engine. The engine can be turned off, for example, to save fuel at idle, at standstill, and upon a request from the driver for torque during launching of the vehicle from a standing start. The electric motor-generator unit may be activated during launch while the engine is being restarted.

Another feature of our invention is the ability of the motor-generator unit to be used as a source of torque for the driving axles while the engine torque is being interrupted during ratio changes in the automatic transmission gearing.

A further feature of our invention is the ability of the electric motor-generator unit to be used with the engine to charge the energy reservoir during vehicle operation.

A further feature of our invention is the ability of the electric motor-generator unit to be used to absorb vehicle kinetic energy during coasting and braking and store this energy in the energy reservoir.

PARTICULAR DESCRIPTION OF THE INVENTION

Figure 1:
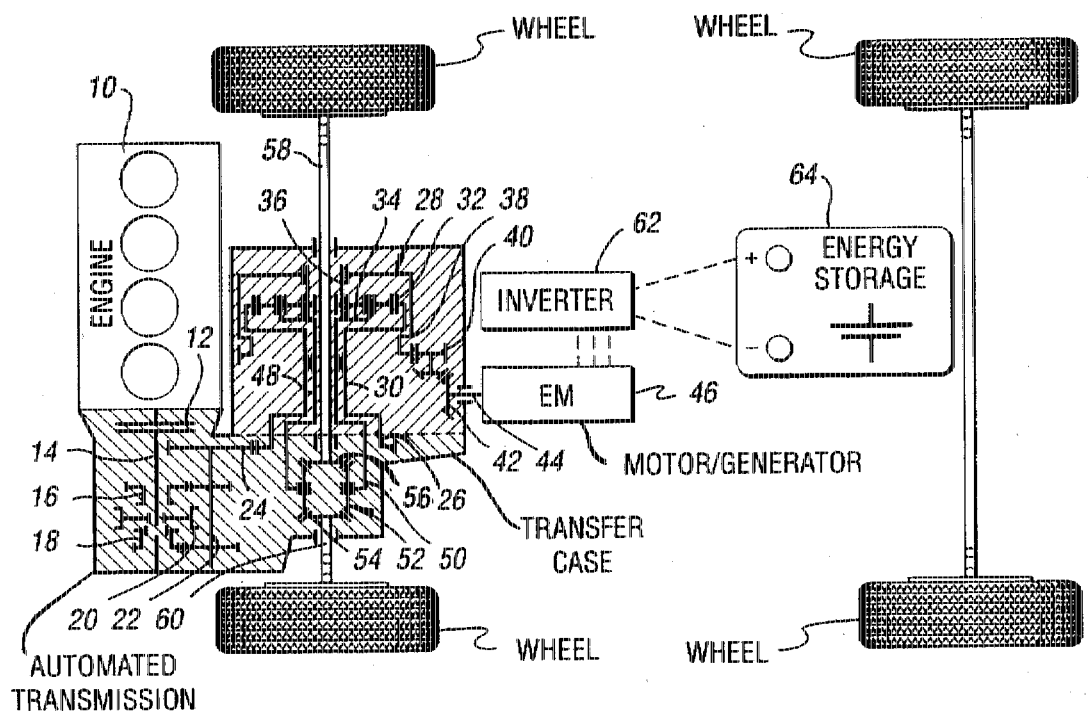
FIG. 1 is a schematic representation of a hybrid vehicle driveline embodying the improvements of our invention.

As seen in FIG. 1, our improved parallel drive hybrid vehicle includes an internal combustion engine 10 with four power cylinders arranged in-line as shown. It should be understood, however, that any of a variety of engine types and sizes can be used as well. The driveline includes a neutral clutch 12 that can be selectively engaged to provide a driving connection with a main shaft 14 of a lay shaft transmission. Drive gears of different pitch diameter are mounted for rotation on the shaft 14. They can be connected by a synchronizer clutch mechanism, schematically shown at 20, thereby providing a geared connection to lay shaft 22, which carries gear elements of a cluster gear assembly engageable with gears 16 and 18. A torque output gear 24 is drivably engaged with gear 26 of a torque transfer gear unit 28. It should be understood that any of a variety of transmission types and sizes can be used as well.

Gear 26 is connected to sleeve shaft 30, which in turn is connected drivably to ring gear 32 of the torque transfer gearing 28. Planetary carrier 34 carries pinions that mesh with gear 32 and with sun gear 36. Torque output gear 38 of the torque transfer gearing 28 engages drive gear 40, which meshes with bevel gear 42 carried by the torque input shaft 44 of electric motor-generator unit 46.

In the embodiment of FIG. 1, sleeve shaft 30 is connected directly to sleeve shaft 48, which transfers driving torque to differential carrier 50. Differential carrier pinions of differential gear unit 52 are journalled on the carrier 50 and engage differential side gears 54 and 56. Axle shaft 58 is connected drivably to side gear 56, and axle shaft 60 is connected drivably to side gear 54.

In the embodiment of FIG. 1, sleeve shaft 30 is connected drivably to shaft 48 so that they rotate together. It is possible then for the torque transfer gearing 28, which may be a part of a regular production torque transfer gear system for a four-wheel drive automotive vehicle, to be adapted especially for use with the driveline of our invention for a parallel drive hybrid vehicle.

When the motor-generator unit is acting as a generator, it is capable of converting mechanical energy to electrical energy. The electrical energy developed by the motor-generator unit is transferred to an inverter 62 which converts alternating voltage and current to direct voltage and current, thereby permitting energy distribution to an energy storage reservoir device 64, schematically illustrated in FIG. 1. The device 64 could be an electro-chemical battery, a flywheel or an ultra-capacitor, for example. When the motor-generator unit acts as a motor, the inverter will function in known fashion to convert direct current and voltage to alternating current and voltage.

Figure 2:
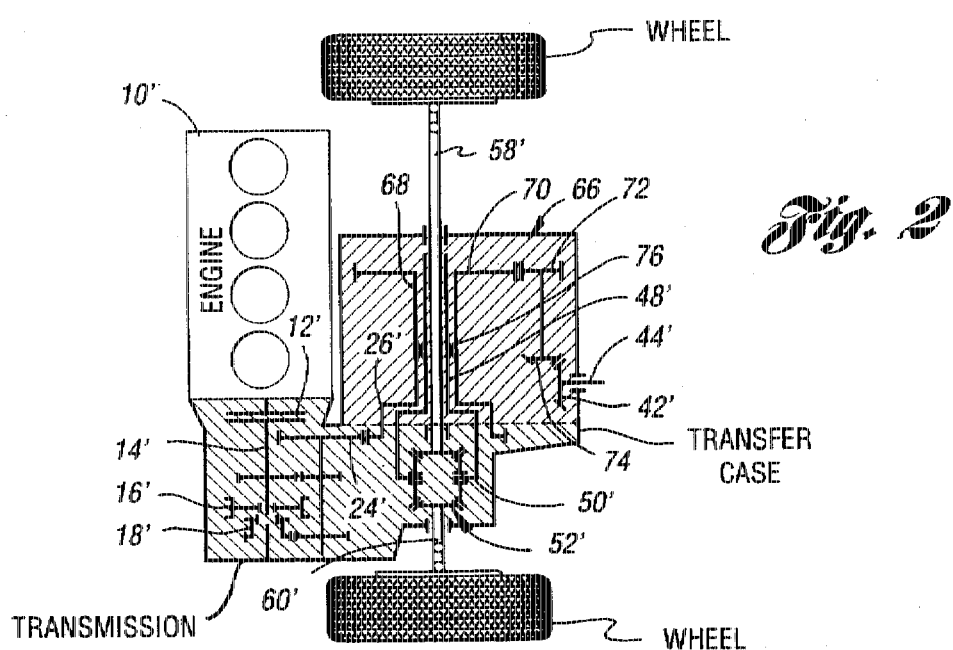
FIG. 2 is a schematic representation of a gearing arrangement that can be used in lieu of the gearing arrangement of FIG. 1 for transferring torque from the engine and from the motor-generator unit to the driving axle of the vehicle and for delivering torque to the motor-generator unit when the internal combustion engine is fully activated.

FIG. 2 is an adaptation of the driveline illustrated in FIG. 1 wherein the conventional torque transfer gearing 28 is replaced by a specially designed gear system 66 that is dedicated for use in a parallel drive hybrid vehicle embodying the improvements of our invention. The gearing 66 functions in the same way as the torque transfer gearing 28 of the design in FIG. 1. It includes a torque input gear 26' corresponding to the gear 26 of the FIG. 1 embodiment. Gear 26' is connected to sleeve shaft 68, which drives torque delivery gear 70. Torque delivery gear 72 meshes with gear 70 in the torque flow path for the motor-generator unit. Gear 72 drives gear 74, which meshes with motor-generator unit drive gear 42'. Sleeve shaft 48', which corresponds to the sleeve shaft 48 of the embodiment of FIG. 1, is connected drivably to sleeve shaft 68, as shown at 76. Sleeve shaft 48 drives differential carrier 50' of the differential gear unit 52'. Differential gear unit 52' delivers driving torque to each of the two axle shafts 58' and 60'.

The elements of the driveline of FIG. 2 that have counterpart elements in the driveline of FIG. 1 have been indicated by reference numerals corresponding to the reference numerals of FIG. 1, although prime notations are added.

In the embodiments of FIGS. 1 and 2, both the internal combustion engine and the electric motor-generator unit provide torque for powering the vehicle. The electric motor-generator unit, in addition to providing positive motoring torque, can also function as a generator to provide negative torque to convert driveline kinetic energy to electric energy. Negative torque can be provided to simulate the engine braking caused by engine pumping losses or by vehicle braking initiated by the vehicle operator. During both engine braking and vehicle braking modes, the negative torque converts the vehicle kinetic energy to electrical energy.

During shifting, the neutral clutch 12 of FIG. 1 or the neutral clutch 12' of FIG. 2 is disengaged as the automatic transmission gearing changes ratio. This is characterized by an interruption in the torque delivery from the internal combustion engine to the wheels. At that time, the torque of the motor-generator unit can be used as a substitute for engine torque, thereby minimizing the torque interruption perceived by the vehicle occupants.

If the vehicle driver requests a rapid increase in acceleration, an additional positive torque is required. This can be supplied by the electric motor-generator unit with its positive torque mode. The output torque of the internal combustion engine then can be more slowly adjusted to the new torque level that is required. As the internal combustion engine output torque is gradually increased, the contribution from the electric motor-generator unit is correspondingly decreased. Because of this capacity to gradually change the load on the internal combustion engine, both emissions for the engine and adverse transients in fuel consumption can be minimized.

When the vehicle is decelerating, the kinetic energy of the vehicle can be efficiently recovered by the electric motor-generator unit as it acts in its generator mode. This may occur during braking of the vehicle as well as during non-braked deceleration of the vehicle. The energy is stored in the energy storage reservoir 64 where it can be called upon later to power the electric motor-generator unit as an electric motor in its driving mode.

During urban driving, considerable fuel consumption is used by vehicles having conventional powertrains during coast-down and during engine idling periods. This contributes significantly to lower fuel consumption efficiency. This problem is alleviated by our invention since the electric motor-generator unit can be used as a motor to launch the vehicle when the vehicle is accelerating from a standing start. This permits the automatic controller to turn off the internal combustion engine ignition during vehicle standstill. During launch of the vehicle using the electric motor-generator unit, the engine can be restarted, and propulsion torque can be shifted at the appropriate instant from the electric motor to the engine. The engine thus avoids rapid acceleration with the accompanying fuel efficiency loss and reduction in the quality of the engine exhaust emissions.

If the driver releases his foot from the accelerator pedal, the initial negative torque that would have been provided by the engine is instead provided by the electric motor-generator unit, during which time the output of the internal combustion engine can slowly be adjusted to the new torque level that is required. As the engine output torque is being reduced, the amount of that negative torque required to be absorbed by the electric motor-generator unit acting as a motor is also reduced.

Figure 3A:
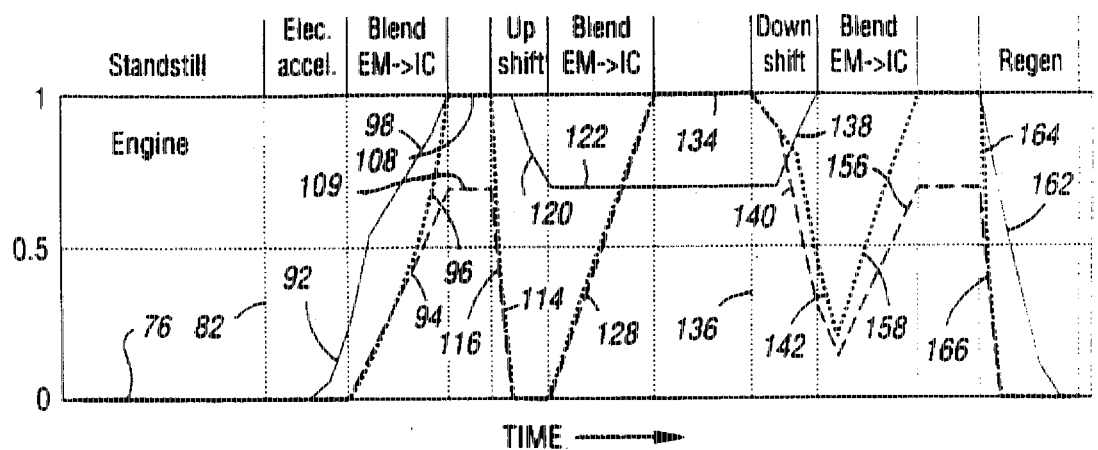
FIGS. 3a, 3b and 3c show the relationship of speed, torque and power for the engine, the electric motor-generator unit and the traction wheels when plotted against time beginning at the instant of a standing start and ending after completion of a downshift and coast-down of the vehicle, FIG. 3a showing the plot for the engine, FIG. 3b showing the plot for the motor, and FIG. 3c showing the plot for the traction wheels.
Figure 3B:
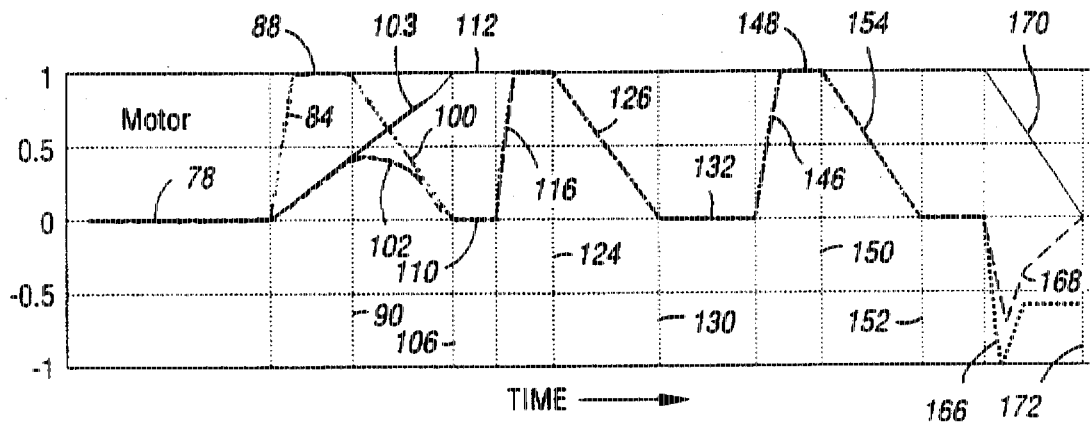
Figure 3C:
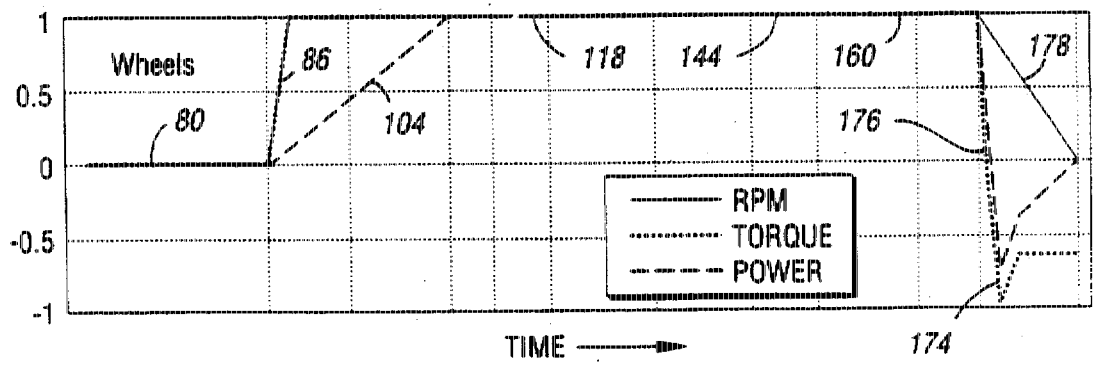

In the performance charts plotted in FIGS. 3a, 3b and 3c, we have shown the relationship between time and the speed, torque and power for the engine, the motor-generator unit and the wheels, respectively. The ordinates of the plots of FIGS. 3a, 3b and 3c show a value of unity which represents the magnitude of the torque demanded by the operator.

In the examples shown in FIGS. 3a, 3b and 3c, the values for rpm, torque and power are normalized with the maximum value for rpm, torque and power over the depicted operating spectrum of the engine, the motor or the wheels.

When the vehicle is at a standstill, the engine operates at zero output torque, as indicated by the torque line 76 in FIG. 3a. The output torque of the motor-generator unit also is at zero, as indicated by the torque line at 78 in FIG. 3b. The torque at the wheels obviously is at a zero level also, as indicated at 80.

When acceleration is initiated at time 82, the torque of the motor-generator unit increases over a short period of time, as shown at 84 in FIG. 3b. The torque of the wheels also increases at a fast rate, as shown at 86. Maximum torque during acceleration is reached, as shown at 88 in FIG. 3b, during the period between the time 82 and the time 90 as the motor-generator unit is delivering torque to the wheels and the engine is being restarted. The engine begins to develop speed as shown by the speed curve at 92 during the acceleration period between time 82 and time 90.

Time 90 is followed by a time period during which the torque of the engine, shown at 94, and the power at the engine, shown at 96, are increasing. This results in an increase in engine rpm, as shown at 98. At that time, the torque of the electric motor-generator unit is decreasing, as shown at 100 in FIG. 3b. The power of the electric motor-generator unit is decreasing during that same time period, as shown at 102. The speed of the motor-generator unit increases, as shown at 103, because of the direct coupling of the engine with the wheels. The resultant power at the wheels increases, as shown in FIG. 3c at 104.

The period during which the torque of the engine is being blended with the torque of the motor-generator unit ends at time period 106.

Following time period 106, the engine is operating at the operator's demanded torque, as shown at 108, and the motor-generator unit is operating at zero torque, as shown at 110 in FIG. 3b. The power of the engine is at the steady-state value shown at 109, and the power of the motor-generator unit is at zero. The speed of the motor-generator unit remains at its high value, as shown at 112.

During an upshift, power at the engine falls rapidly as the engine throttle is closed or the fuel supply is shut off. This is indicated in FIG. 3a at 114. The torque and the power at the motor increase rapidly at this instant, as shown at 116 in FIG. 3b. Thus the torque at the wheels, as shown at 118 in FIG. 3c, will remain relatively constant since the fall-off of engine torque is matched by the increase in torque at the motor. The engine speed during the shift interval will decrease, as indicated by the line 120, as the engine coasts down following disengagement of the clutch 12. The engine speed decrease will continue until the desired speed corresponding to the commanded upshift is achieved, as indicated at 122.

Upon completion of the upshift at time 124, the engine torque increases as the clutch 12 is re-engaged following the upshift, as shown at 128. Simultaneously, the torque of the motor-generator unit falls off, as indicated by the line 126. During the blend period between time 124 and time 130, the torque of the motor is blended with the torque of the engine until the torque of the motor reaches zero, as shown at 132. At that time, the torque of the engine, as shown at 134, reaches its maximum value for the selected operating spectrum. This is the steady-state driving condition.

At the initiation of the downshift at time 136, it will be necessary to increase the speed of the engine after clutch 12 has been disengaged so that the engine speed corresponding to the downshifted ratio for a given vehicle velocity will be greater. This is indicated by line 138. During the downshift, engine torque will fall, as indicated by line 140. The engine power also will fall in synchronism with the fall-off of torque, as indicated at 142.

The torque at the wheels, as shown at 144, will remain relatively constant because the motor torque will have been increased, as shown at 146, to the operator's commanded level shown at 148.

At the completion of the downshift, a blend period will be entered beginning at time 150 and ending at time 152. During that blend period following a downshift, motor torque is decreased as shown at 154, and engine torque is increased, as shown at 156. Similarly, engine power is increased, as shown at 158. Hence the decrease in motor torque is matched by the increase in engine torque, and the torque at the wheels will remain constant, as shown at 160.

During braking, the motor-generator unit will enter a regenerative mode. At that time, the engine throttle will be relaxed or the fuel supply will be shut off. Clutch 12 will be released and the ignition will be turned off. As a result, the engine speed will fall off to zero, as shown at 162 in FIG. 3a. Engine power also will decrease, as shown in 164, and engine torque will decrease, as shown at 166. Motor torque will increase in a negative direction, as shown at 166. This is matched by a corresponding increase in motor power in a negative direction, as shown at 168. The braking period will result in a decrease in motor speed, as shown at 170. The regenerative period ends at time 172.

The torque at the wheels during the regenerative period will decrease in the braking or negative direction as shown at 174. It decreases to zero and then increases in a negative direction, as shown at 176. The regenerative action continues until the regenerative period ends at time 172. The wheel speed decreases to zero at the end of the regenerative period, as shown at 178 in FIG. 3c.

We contemplate that the motor-generator unit may comprise an induction motor. When it is functioning as a generator, it will create an alternating current that can be inverted and transferred to the energy storage reservoir as a direct current.

During the engine braking mode, the motor initially will absorb a reaction torque so that the engine throttle can be adjusted more slowly to a reduced setting. A substantial increase in the quality of the exhaust emissions will result.

When the vehicle is in a steady-state, forward-driving mode and acceleration is commanded by the vehicle operator, the motor-generator unit will initially provide a driving torque source while the engine speed slowly increases. It thus is not necessary to rapidly increase the throttle setting during acceleration. This feature also contributes to improved quality of the engine exhaust emissions.

During engine-off operations, the clutch will be disengaged. This further improves fuel economy and improves the quality of the engine exhaust emissions.

Our improved hybrid driveline makes it possible to locate the motor-generator unit in any of a variety of locations, thereby making it possible for the vehicle designer to package the driveline components in the most efficient manner.

Although we have described a preferred embodiment of the invention, it will be apparent to persons skilled in the art that modifications may be made without departing from the scope and the intent of our invention as it is defined by the following claims.

What is claimed is:

1. A hybrid vehicle powertrain comprising an internal combustion engine and an electric motor-generator unit;

a transmission having multiple-ratio gearing between a transmission power input shaft and a transmission power output shaft;

a geared differential assembly having a differential carrier connected drivably to said transmission power output shaft and to side gears;

a pair of driving axle shafts connected drivably to said side gears, said transmission power output shaft being a sleeve shaft, and one of said driving axle shafts being rotatably received within said sleeve shaft;

auxiliary gearing defining an auxiliary torque flow path between said motor-generator unit and said differential carrier;

said multiple-ratio gearing defining a main torque flow path between said transmission power input shaft and said differential carrier, said main torque flow path being disposed in parallel relationship with respect to said auxiliary torque flow path;

engageable and disengageable main clutch means for establishing and disestablishing a driving connection between said engine and said transmission power input shaft; and an electrical energy storage reservoir connected electrically to said motor-generator unit;

said motor-generator unit storing electric energy in said storage reservoir when said engine delivers torque to said transmission power input shaft with said clutch means engaged and said motor-generator unit delivering torque to said differential carrier when said main torque flow path is interrupted by disengagement of said main clutch means.

2. The hybrid vehicle powertrain set forth in claim 1 wherein said electric motor-generator unit incudes an inverter circuit means connecting said motor-generator unit to said storage reservoir for transforming alternating current and voltage generated by said motor-generator unit to a direct current and voltage, thereby converting mechanical energy into electric energy and also for transforming direct current and voltage from said storage reservoir to alternating current and voltage to be used by said motor-generator unit, thereby converting electric energy into mechanical energy.

3. The hybrid vehicle powertrain set forth in claim 1 wherein said main clutch means, when disengaged, interrupts torque transfer from said engine to said transmission power input shaft during changes in ratio of said multiple ratio gearing;

said transmission including selectively engageable transmission clutch means for establishing and disestablishing selectable transmission gearing ratios;

said motor-generator unit supplying driving torque to said axle shafts during ratio shafting of said multiple-ratio gearing.

4. The hybrid vehicle powertrain set forth in claim 1 wherein said main clutch means is disengageable to effect interruption of said main torque flow path when said engine is deactivated and said axle shafts are stationary, said motor-generator unit delivering driving torque during start-up to said axle shafts prior to reactivation of said engine.

5. The hybrid vehicle powertrain set forth in claim 1 wherein said axle shafts are connected to said motor-generator unit during deceleration of said axle shafts whereby kinetic energy is converted to electrical energy for storage in said storage reservoir during engine braking.

* * * * *